US012411649B2

United States Patent
Dickey et al.

(10) Patent No.: US 12,411,649 B2
(45) Date of Patent: Sep. 9, 2025

(54) DIGITAL SIGNAL PROCESSING FOR CLOUD-BASED LIVE PERFORMANCE

(71) Applicant: JackTrip Labs, Inc., Burlingame, CA (US)

(72) Inventors: Michael Dickey, Palo Alto, CA (US); Dominick Hing, Palo Alto, CA (US); Nelson Wang, Daly City, CA (US)

(73) Assignee: JACKTRIP LABS, INC., Burlingame, CA (US)

( * ) Notice: Subject to any disclaimer, the term of this patent is extended or adjusted under 35 U.S.C. 154(b) by 378 days.

(21) Appl. No.: 18/114,208

(22) Filed: Feb. 24, 2023

(65) Prior Publication Data

US 2023/0305798 A1 Sep. 28, 2023

Related U.S. Application Data

(60) Provisional application No. 63/268,548, filed on Feb. 25, 2022.

(51) Int. Cl.
*G06F 3/16* (2006.01)
*H04L 65/402* (2022.01)
(Continued)

(52) U.S. Cl.
CPC ............ *G06F 3/165* (2013.01); *H04L 65/402* (2022.05); *H04L 65/403* (2013.01); *H04L 65/80* (2013.01)

(58) Field of Classification Search
CPC ................ G06F 3/165; H04N 21/2187; H04N 21/2335; H04N 21/4392; H04N 21/64322;
(Continued)

(56) References Cited

U.S. PATENT DOCUMENTS

2007/0223675 A1    9/2007  Surin et al.
2015/0254056 A1*   9/2015  Walker .................. H04L 47/621
                                                        715/716
(Continued)

OTHER PUBLICATIONS

Caröt et al. (Results of the Fast-Music Project-Five Contributions to the Domain of Distributed Music). Mar. 9, 2020, IEEE Journals https://ieeexplore.ieee.org/document/9027818 (Year: 2020).*
(Continued)

*Primary Examiner* — Yogeshkumar Patel
(74) *Attorney, Agent, or Firm* — MORGAN, LEWIS & BOCKIUS LLP

(57) ABSTRACT

An audio processing and streaming server system includes an input bus, a digital signal processor (DSP), a first and second stream generators. The input bus includes a plurality of input audio channels, each corresponding to a respective input stream of a plurality of input streams, each received at the server from one of a plurality of audio interface devices. The DSP is configured to apply at least one signal chain to at least some of the plurality of input audio channels; and output first and second master audio mixes in accordance with the at least one signal chain. The first stream generator is configured to convey the first master audio mix to the audio interface devices in a first live stream with no added buffering latency, and the second stream generator is configured to buffer and convey the second master audio mix in a second live stream.

20 Claims, 13 Drawing Sheets

(51) Int. Cl.
*H04L 65/403* (2022.01)
*H04L 65/80* (2022.01)

(58) Field of Classification Search
CPC ......... H04N 21/64784; H04N 21/8113; H04N 21/43072; H04N 21/478; H04N 21/854; H04L 65/402; H04L 65/403; H04L 65/80; G10H 1/0008; G10H 1/0058; G10H 2220/106; G10H 2240/175; H04H 60/04
See application file for complete search history.

(56) References Cited

U.S. PATENT DOCUMENTS

| | | |
|---|---|---|
| 2016/0036915 A1 | 2/2016 | Karkkanen et al. |
| 2018/0288467 A1* | 10/2018 | Holmberg ............ H04N 21/242 |
| 2020/0120363 A1* | 4/2020 | De Decker ........ H04N 21/4884 |
| 2020/0184983 A1* | 6/2020 | Cengarle ............ H04N 21/8113 |
| 2020/0344498 A1* | 10/2020 | Lazar ................ H04N 21/47202 |
| 2021/0204003 A1* | 7/2021 | Nicol ................. H04N 21/2187 |
| 2021/0208842 A1* | 7/2021 | Cassidy ................. G11B 27/28 |
| 2021/0314632 A1* | 10/2021 | De Decker ........ H04N 21/2187 |
| 2022/0014570 A1* | 1/2022 | Goldstein ............. H04L 65/403 |

OTHER PUBLICATIONS

Alexander Carot et al., Result of the Fast-Music Project-Five Contributions to the Domain of Distributed Music, IEEE Access, vol. 8, 2020, Mar. 9, 2020, 27 pgs.

Emmanouil Lakiotakis et al., Improving Networked Music Performance Systems Using Application-Network Collaboration, arXiv:1808.09405v2 [cs.SY], Sep. 6, 2018, 20 pgs.

Jacktrip Labs, Inc., International Search Report and Written Opinion, PCT/US2023/013884, May 9, 2023, 15 pgs.

* cited by examiner

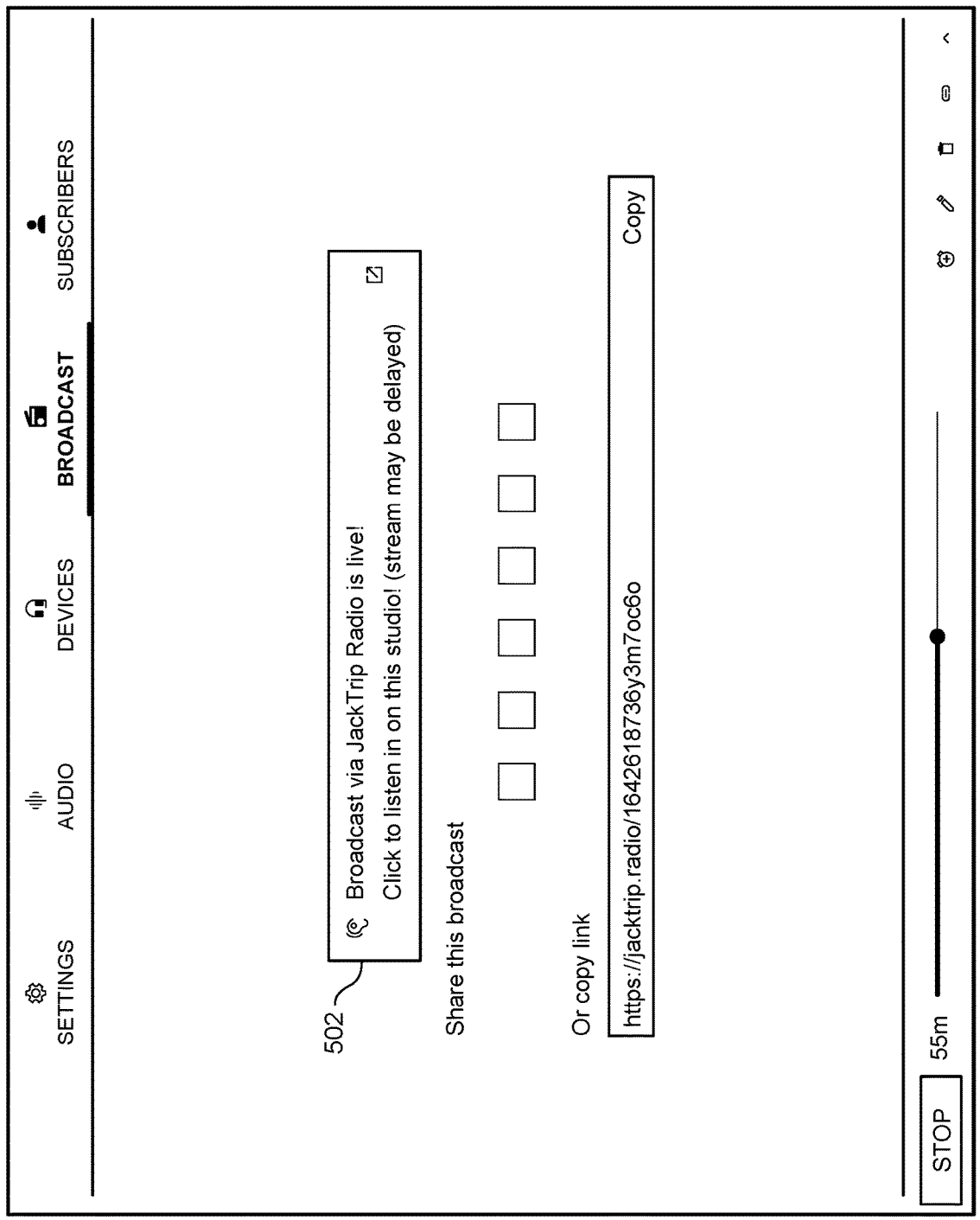

DIGITAL SIGNAL PROCESSING FOR CLOUD-BASED LIVE PERFORMANCE

PRIORITY

This application claims priority to U.S. Provisional Patent Application No. 63/268,548, filed Feb. 25, 2022, which is hereby incorporated by reference in its entirety.

BACKGROUND

Digital audio has evolved by leaps and bounds over the past few decades, enabling computer code to perform the work that traditionally required specialized hardware. Digital audio can also be easily streamed over computer networks, which has revolutionized the distribution of content.

Digital signal processing (DSP) enables one to manipulate digital audio signals in real-time through the use of computer code. Many software applications have evolved that leverage DSP technologies, in particular in the fields of professional audio recording, mixing, and mastering. Increasingly, online collaboration software applications are incorporating DSP technologies like noise cancellation to improve the quality of sound for human conversations.

While the application of DSP effects to audio can make our online experiences more realistic, they can be compute intensive, overwhelming the capabilities of some clients. For example, when music is being performed by multiple people (potentially hundreds of people, in the case of a large chorus), creating a realistic master mix quickly becomes computationally overwhelming.

SUMMARY

This disclosure describes a cloud computing platform running DSP algorithms to create realistic live performance environments for hundreds of participants, or more, with minimal computational requirements for each client device.

Audio from each participant is digitized using an analog to digital converter (ADC) and transmitted over the Internet to a hub server. The hub server uses a local bus to represent one or more channels of audio (also referred to as audio streams) received from each client. A signal chain is used to define zero or more processing steps which are applied to the audio channels. Each of these steps may be referred to as a "link." Different links may perform different types of audio processing, and each instance of a link has a configurable state. A signal chain is also configurable, and can be applied to the source audio channels arriving from a specific client, groups of clients, or all clients.

The output of one or more signal chains can be connected to other signal chains. At any point in the process, audio channels can also be optionally "mixed" together into fewer audio channels. A master mix can be generated from a specific configuration of signal chains, and sent back to each participant, with everyone hearing the same thing. Alternatively, "personal" mixes can be generated and transmitted back to each participant, or "group mixes" to groups of participants.

Specifically, in some implementations, an audio processing and streaming server system comprises an input bus, a digital signal processor, a first stream generator, and a second stream generator. The input bus includes a plurality of input audio channels, wherein each of the plurality of input audio channels corresponds to a respective input stream of a plurality of input streams, and each of the plurality of input streams is received at the server from one of a plurality of audio interface devices located remotely from the server and from each other. The digital signal processor is configured to apply at least one chain of processing steps to the plurality of input audio channels, and output a first master audio mix and a second master audio mix in accordance with the at least one chain of processing steps. The first stream generator is configured to convey the first master audio mix to the plurality of audio interface devices in a first live stream with no added buffering latency. The second stream generator is configured to buffer the second master audio mix, and convey the buffered second master audio mix to a plurality of computing devices located remotely from the server in a second live stream.

In some implementations, the first live stream is associated with a maximum end-to-end latency corresponding to a difference in time between (i) transmitting respective input streams from the plurality of audio interface devices and (ii) receiving the first live stream at the plurality of audio interface devices; the second live stream is associated with a delayed end-to-end latency corresponding to a difference in time between (i) transmitting respective input streams from the plurality of audio interface devices and (ii) receiving the second live stream at the plurality of computing devices; and the delayed end-to-end latency is higher than the maximum end-to-end latency. In some implementations, the maximum end-to-end latency is 25 milliseconds (ms) or less (e.g., 25 ms, 20 ms, 15 ms, and so forth). Alternatively, the maximum end-to-end latency may be greater than 25 ms (e.g., 30 ms).

In some implementations, the plurality of audio interface devices include respective analog-to-digital audio converters configured to convert vocal and/or instrumental audio signals to digital audio signals.

In some implementations, the at least one chain of processing steps includes two or more of a reverb adjustment, a gain adjustment, a pan adjustment, and filter adjustment, an equalizer adjustment, and a noise gate adjustment.

In some implementations, applying the at least one chain of processing steps to the plurality of input audio channels includes: applying a first chain of processing steps to the plurality of input audio channels, wherein the first chain of processing steps is associated with a first processing latency, and the first master audio mix is an output of the first chain of processing steps; and applying a second chain of processing steps, different from the first chain of processing steps, to the plurality of input audio channels, wherein the second chain of processing steps is associated with a second processing latency higher than the first processing latency, and the second master audio mix is an output of the second chain of processing steps.

In some implementations, applying the at least one chain of processing steps to the plurality of input audio channels includes: mixing the plurality of input audio channels into an intermediate audio signal; and applying the at least one chain of processing steps to the intermediate audio signal.

In some implementations, applying the at least one chain of processing steps to the plurality of input audio channels includes applying a unique chain of processing steps to each respective input audio channel of the plurality of input audio channels.

In some implementations, applying the at least one chain of processing steps to the plurality of input audio channels includes applying a unique setting of the at least one chain of processing steps to each respective input audio channel of the plurality of input audio channels.

In some implementations, applying the at least one chain of processing steps to the plurality of input audio channels includes: applying a first chain of processing steps to a first subset of the plurality of input audio channels; and applying a second chain of processing steps, different from the first chain of processing steps, to a second subset of the plurality of input audio channels.

In some implementations, applying the at least one chain of processing steps to the plurality of input audio channels includes: applying a first chain of processing steps to the plurality of input audio channels, creating an intermediate input audio signal; and applying a second chain of processing steps, different from the first chain of processing steps, to the intermediate input audio signal.

In some implementations, conveying the first master audio mix to the plurality of audio interface devices in the first live stream includes: receiving a first performer mix profile setting from a first audio interface device of the plurality of audio interface devices; receiving a second performer mix profile setting, different from the first performer mix profile setting, from a second audio interface device of the plurality of audio interface devices; conveying the first master audio mix in accordance with the first performer mix profile setting to the first audio interface device; and conveying the first master audio mix in accordance with the second performer mix profile setting to the second audio interface device.

In some implementations, conveying the first master audio mix to the plurality of audio interface devices in the first live stream includes: receiving a group performer mix profile setting from a first audio interface device of the plurality of audio interface devices; and conveying the first master audio mix in accordance with the group performer mix profile setting to a first subset of the plurality of audio interface devices.

In some implementations, conveying the buffered second master audio mix to the plurality of computing devices in the second live stream includes: receiving a first listener mix profile setting from a first computing device of the plurality of computing devices; receiving a second listener mix profile setting, different from the first listener mix profile setting, from a second computing device of the plurality of computing devices; conveying the second master audio mix in accordance with the first listener mix profile setting to the first computing device; and conveying the second master audio mix in accordance with the second listener mix profile setting to the second computing device.

In some implementations, applying the at least one chain of processing steps to the plurality of input audio channels includes: while conveying the first master audio mix to the plurality of audio interface devices in the first live stream, receiving a first setting adjustment from a first audio interface device of the plurality of audio interface devices; adjusting the at least one chain of processing steps in accordance with the first setting adjustment; and conveying the first master audio mix in accordance with the adjusted at least one chain of processing steps in the first live stream.

BRIEF DESCRIPTION OF THE DRAWINGS

The foregoing summary, as well as the following detailed description, will be better understood when read in conjunction with the appended drawings. For the purpose of illustrating the present disclosure, there are shown in the drawings embodiments which are presently preferred, wherein like reference numerals indicate like elements throughout. It should be noted, however, that aspects of the present disclosure can be embodied in different forms and thus should not be construed as being limited to the illustrated embodiments set forth herein. The elements illustrated in the accompanying drawings are not necessarily drawn to scale, but rather, may have been exaggerated to highlight the important features of the subject matter therein. Furthermore, the drawings may have been simplified by omitting elements that are not necessarily needed for the understanding of the disclosed embodiments.

FIG. 5 is an example user interface including broadcast features for the cloud-based live performance streaming platform of FIG. 1 in accordance with some implementations.

DETAILED DESCRIPTION

Figure 1:
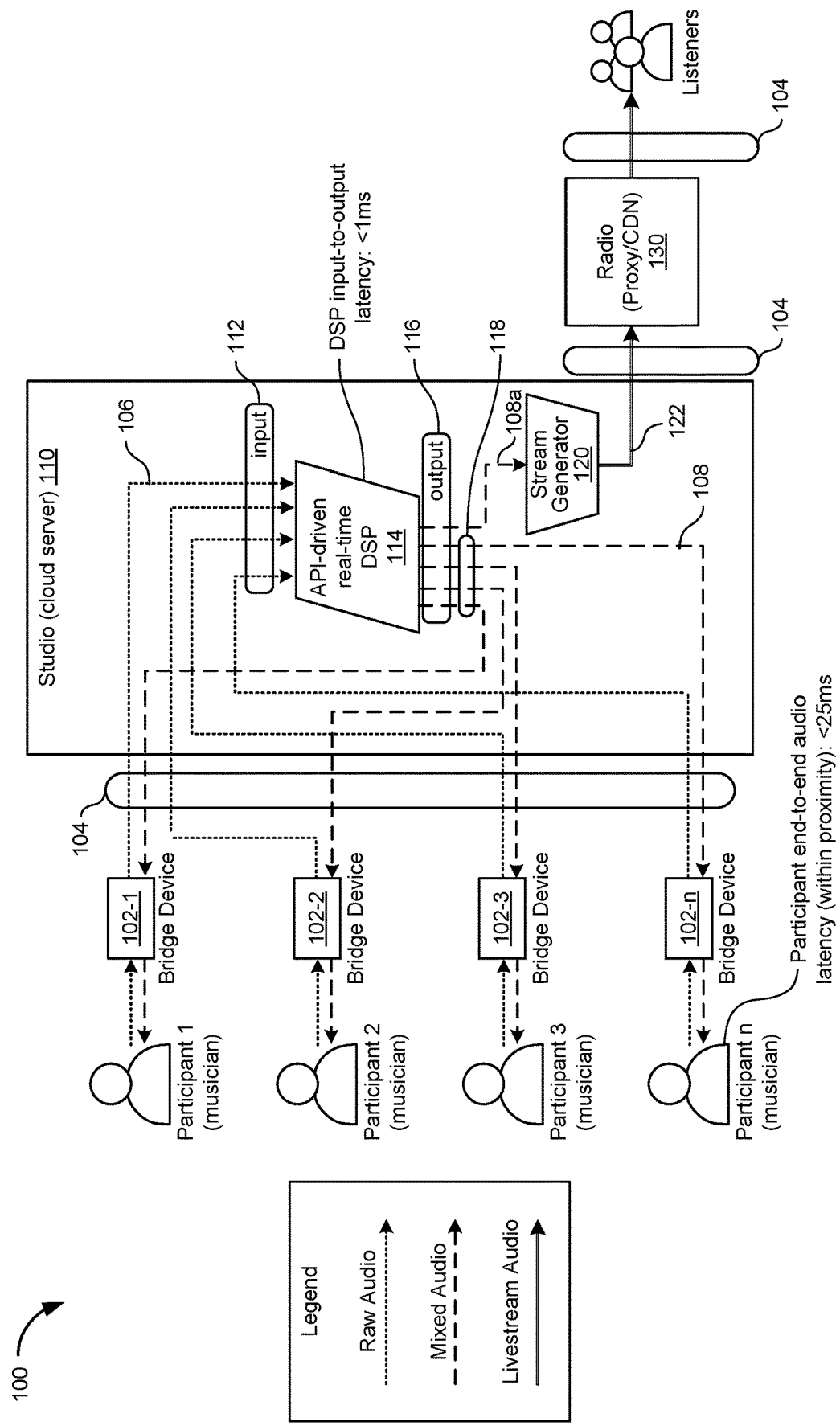
FIG. 1 is a block diagram of a cloud-based live performance streaming platform in accordance with some implementations.

The present subject matter will now be described more fully hereinafter with reference to the accompanying Figures, in which representative embodiments are shown. The present subject matter can, however, be embodied in different forms and should not be construed as limited to the embodiments set forth herein. Rather, these embodiments are provided to describe and enable one of skill in the art.

Technologies designed to stream live performances including audio and video content to large audiences over the Internet (e.g., YouTube and Vimeo) have one fundamental limitation: all of the performers must be present within the same physical location. This disclosure describes a cloud-based streaming platform that enables artists to perform simultaneously at a distance (for example, from their own homes), and easily stream their performances to both small and large audiences, even millions of people worldwide. This eliminates barriers for how artists collaborate with one another, how they interact with their supporters and fans, and how they monetize the content that they create.

While primarily useful for music artists, the streaming platform described herein could also be applicable in other markets as well (e.g., talk shows, live podcasts, gaming, sports casting, educational seminars, and so forth).

In order to support such an endeavor, there are many challenges that need to be overcome. One of the most important challenges is latency. This is the delay in time between audio or video created by one performer reaching another performer. Music is especially sensitive to latency, and research suggests a threshold for success of around 25 milliseconds. In some implementations, this can vary slightly depending on both the tempo of music and one's own personal tolerance for latency.

The streaming platform described herein is designed to transport audio and video content between performers as efficiently as possible. Many thousands of artists worldwide may use such a platform to perform together using the consumer grade Internet connections available at their homes.

The Internet, however, can only transport audio and video as fast as the speed of light. Practically, it can only transmit at a fraction of it. Light travels about 300 kilometers in 1 millisecond. That suggests a theoretical limit of about 7,500 kilometers or 4,660 miles. For context, the distance from Los Angeles to New York is about 2,445 miles. As Internet infrastructure evolves, synchronous performance of artists distributed across a single continent is both possible and inevitable.

Early technical approaches for artistic collaboration established direct connections between every artist. In such a model, the audio (and/or video) produced by each artist would be transmitted to every other person who is also performing, using as direct a network path as possible. This model has the advantage of not requiring an intermediary to forward the audio (and/or video). However, because the resource requirements scale linearly with the total number of performers, this model can place a significant burden on each performer's Internet connection and computer. In practice, this model works best for those who have extremely good computers and Internet connections. Such a model is typically unable to scale beyond a few performers.

In another model, a hub server may be used. This model requires an intermediary application, or server. All of the audio (and/or video) is transmitted to the intermediary, which combines it into a master copy that it sends back to all of the performers. This model scales better because the resource demands for the performers are constant, regardless of the number. One challenge of the hub server model is that a poorly implemented intermediary can introduce additional latency and/or scalability bottlenecks. Naive adopters of this model may try to host a hub server using a lower-bandwidth, consumer grade home Internet connection. They may use a laptop computer which does not have adequate processing power. Such a model is typically unable to scale unless the intermediary is a modern server residing in a datacenter environment. Further, a poorly implemented intermediary may also be physically located thousands of miles away from the performers. This can add significant additional latency that reduces the chance of having successful collaborations.

In yet another model, cloud computing enables software application developers to provision applications (or parts of an application). A virtual studio application may leverage multiple cloud computing providers to seamlessly deploy and manage hub server intermediaries at many physical locations worldwide. Resources may be provisioned on-demand and only as needed, enabling consistency and efficiency that dramatically lowers costs. Cloud computing servers are typically located at the intersections of the world's fastest Internet highways. If a musician lives far from a server, the musician may happen to be lucky with respect to other musicians (e.g., same Internet provider, down the street, etc.), allowing the musician to achieve lower latency numbers with peer-to-peer. Otherwise, the musician's audio data may be directed through such a server anyway. The cloud computing model may use edge computing, which enables developers to more easily deploy latency sensitive applications to locations that are physically closer to end users.

Taking a hybrid approach to the aforementioned models, a virtual studio application can be configured to enable thousands of distributed artists to create live performances together. These performances may be streamed live to audiences over the Internet. But this has always required engineers who have advanced knowledge how to use these tools and perform these integrations, and such streaming may add to the latency experienced by the performers. This streaming platform described herein enables distributed artists to easily stream live performances to any number of audience members, anywhere in the world, without negatively affecting the latency experienced by the performers themselves.

FIG. 1 is a block diagram of a cloud-based live performance streaming platform 100 in accordance with some implementations. Participants (also referred to as musicians, performers, artists, active users, and so forth) produce raw audio and/or video signals through the use of vocal projection (e.g., talking or singing) or performance with an acoustic or electric musical instrument.

Each participant uses an audio interface device 102 to capture the raw audio/video signals, convert the raw signals to a format optimized for transmission through a communication network 104 (e.g., the Internet), and transmit the converted signals to a cloud-based server 110 via one or more communication networks 104. Audio interface devices 102 may comprise analog-to-digital conversion (ADC) circuitry configured to convert analog sound to digital signals (for transmitting to server 110) and/or digital-to-analog conversion (DAC) circuitry configured to convert digital signals to analog sound (for providing audio/video data received from server 110 to participants). Audio interface devices 102 may be configured to interface with, or otherwise include, audio capture hardware (e.g., microphones, external sound cards, digital audio workstations, and so forth) to provide local audio capture processing. In some implementations, audio interface devices 102 may comprise (or otherwise be referred to as) bridge devices 102 and/or audio input/output devices 102. Any given audio interface device 102 may include a plurality of physically distinct and/or communicatively coupled hardware components (e.g., configured for audio/video capture, conversion, and transmission/reception). Alternatively, an audio interface device 102 may be implemented as a single hardware component.

Platform 100 connects distributed participants together for live performance using one or more intermediary hub servers 110. While nothing precludes the use of peer to peer connections between some artists (as described above), at some point, the audio/video for performers needs to be received by a server 110. Server 110 may translate across disparate audio and/or video protocols (e.g., preferred by various audio interface devices 102), enabling each artist to use a preferred tool (e.g., a software client or hardware device), which is best suited for a specific form of art.

Server 110 includes a digital signal processor (DSP) 114 configured to mix the incoming audio/video streams 106. Mixing is the process of combining together the audio and/or video streams received from all of the performers. Peer-to-peer connections may limit the amount of processing that can be performed, which can result in poor quality audio visual experiences. An intermediary (e.g., server 110) is able to perform any amount of real time processing to help make the audio sound and video look as realistic as possible. The resulting master mix (Mixed Audio) is immediately transmitted back to all performers.

In mixing the incoming audio/video streams, DSP 114 applies one or more audio processing chains to the raw audio signals at an input bus 112, outputting mixed audio signals at an output bus 116. Server 110 conveys the mixed audio signals back to the various participants via their respective audio interface devices 102 and communication network(s) 104, using a first stream generator 118.

Server 110 additionally records the mixed audio/video signals and provides them for broadcasting to listeners (also referred to as virtual audience members, content consumers, users, passive users, streamers, live streamers, and so forth). This and further steps are performed asynchronously to the mix transmissions (Mixed Audio transmissions back to the performers), to ensure that no delays are introduced into the live performance streams 108 transmitted to the performers.

In some implementations, server 110 records the audio/video content 108*a* to disk, encoded, for example, using formats such as MPEG or FLAC. Second stream generator 120 breaks up the recorded content into separate files, with each file containing several seconds of the performance. At the completion of each recording interval, second stream generator 120 updates stream metadata to incorporate the new content available. In some implementations, a web server (e.g., 130) running on or remotely from server 110 delivers the stream to any compatible client (referred to herein as a computing device) via one or more communication networks 104.

The first stream generator 118 is configured to minimize end-to-end latency from the perspective of the audio interface devices 102, thereby optimizing the output streams 108 for performance. The second stream generator 120 is configured to buffer the mixed audio signals, thereby optimizing the output streams 108*a*, 122 for quality and listening experience. As such, audio processing and stream generation components of server 110 are separated in accordance with the intended destination of the audio signals, with streams intended for performers being optimized for latency (sometimes at the expense of quality) and streams intended for listeners being optimized for quality at the expense of latency.

In some implementations, the broadcasting server (110 or 130) automatically generates a random secret for every live performance session, and a DNS record is created using the secret which points to the address of the intermediary hub server (110 or 130). This enables any client that knows the secret to discover and request listener stream 122 from the intermediary's web server. In some implementations, a separate, reverse proxy service acts as an origin server for all live streaming content. This translates a URL containing the session secret into a DNS lookup for the intermediary server. Requests are proxied through to the intermediary servers, cached locally, and delivered to clients. The caching of requests minimizes load on server 110, regardless of audience size. In some implementations, a Content Delivery Network (CDN) is configured using the reverse proxy service as an origin. This provides an additional distributed worldwide cache for the listener stream 122. This minimizes load on the reverse proxy service, enabling broadcasting to scale to millions of audience members with minimal resources.

In some implementations, as an alternative to the aforementioned DNS and authorization features, upon completion of each recording interval, the output stream metadata is updated and the content of the stream is synchronized to a remote cloud bucket using a protocol such as S3. A random secret is automatically generated for every live performance session, and the content for each stream is placed into a subdirectory of the cloud bucket. A CDN is configured using the cloud bucket as an origin. This enables broadcasting to scale to millions of audience members with minimal resources. Other alternative approaches for the final delivery of the listener stream 122 may be contemplated by one of ordinary skill in the art.

Referring to FIG. 1, DSP 114 processes the audio input signals 106 arriving at server 110 from audio interface devices 102. For purposes of brevity and so as not to obscure more pertinent aspects of this disclosure, the present discussion describes the processing of audio signals at DSP 114. However, the same concepts may additionally or alternatively be applied to video signals.

In some implementations, server 110 uses a local bus 112 to represent one or more audio channels (also referred to as audio streams) received from each audio interface device 102. DSP 114 uses a signal chain to define zero or more processing steps, which DSP 114 applies to the input audio channels. Each of these steps may be referred to as a "link." Different links may perform different types of audio processing, and each instance of a link may have a configurable state. A signal chain may also configurable, and can be applied to the source audio channels arriving from a specific audio interface device 102, groups of audio interface devices 102, or all audio interface devices 102.

In some implementations, one or more signal chains may be distributed across different servers 110 in data centers located in different geographic locations. Thus, server 110 may represent a server system including a plurality of servers configured to distribute the processing as described herein with reference to DSP 114. For example, servers located remotely from each other (e.g., in Chicago and San Francisco) may have different signal chains running in each location. Different combinations of these signal chains may produce different audio output signals. Thus, audio streams 106 for different musicians may be processed differently depending on where the musician are located, the latencies associated with communication networks 104, and the different combinations of signal chains running in DSPs 114 of corresponding servers 110.

In some implementations, the output of one or more signal chains may be connected to other signal chains. At any point in the process, audio channels can also be optionally mixed together into fewer audio channels. A master mix can be generated from a specific configuration of signal chains, and sent back to each participant (as mixed audio streams 108), with every performer hearing the same thing. Alternatively, personal mixes can be generated and transmitted back to each performer, or group mixes can be generated and transmitted back to groups of performers.

In some implementations, DSP 114 creates a unique mix for a live stream/broadcast (108*a*) versus the mix created for performers or groups of performers (108). Stated another way, performers may receive a first live mix (associated with a latency lower than 25 ms), while audience members (listeners) may receive a second live mix (associated with a latency higher than 25 ms due to the use of more complicated signal chains). As discussed above, audience members have a completely different tolerance for latency versus live performers. Performers need to hear the mix within 25 ms to keep a pulse, but it makes no difference how much delay is added to streams consumed by audience members.

The low latency tolerance for performers also means that performers are likely to experience occasional late arriving data packets due to network jitter. In some implementations, the audio interface devices 102 skip late arriving packets, effectively skipping the interval of time associated with such packets. From the perspective of the performer, if the packet is late, it might as well have never arrived, since playing the late-arriving packet would confuse and frustrate the performer who has since moved on to performing a subsequent portion of a given piece while a previous portion is playing in his or her ears. Performers can tolerate the occasional clicks or pops that this (skipping packets) may cause. In some implementations, machine learning-enabled loss concealment can make these artifacts effectively inaudible. For example, a skipped time interval may be filled with audio data taken from just before the skipped time interval, and the transition between the end of the skipped interval and the beginning of the next interval (during which audio data was received on time) may be blended by, for example, blending gain envelopes associated with each time interval.

However, when recording or streaming to an audience, it is desirable to use large receive buffers (e.g., in second stream generator 120) that can tolerate even the most extreme cases of jitter. These large buffers may introduce too much latency to meet the thresholds required for live performance, but they create no problem at all for the other cases (for recording and broadcasting to audience members), and help ensure that the sound quality is pristine, or otherwise optimized. As such, listener stream 122 may be created off the more heavily buffered audio for live streaming and recording. These could also employ different signal chains, which include signal processing techniques that introduce additional latency (which would not work for live performance).

In some implementations, in addition to or as an alternative to adding latency/buffering to the live stream 108a, the live stream 108a and perform streams 108 may be transmitted to audience members and performers, respectively, using the same or similar latency, but with different signal chains. Specifically, DSP 114 may process input streams 106 using (i) a first set of one or more signal chains, producing a performer mix, and (ii) a second set of one or more signal chains, producing an audience mix. The second set of one or more signal chains may differ from the first set by at least one processing step (e.g., reverb), or by at least one configurable element of at least one processing step (e.g., more reverb versus less reverb). The performer mix may be transmitted as output streams 108 to interface devices 102 associated with the performers, and the audience mix may be transmitted as live stream 122 to a broadcasting server 103 and/or computing devices associated with audience members (listeners). In one example, the performer stream may be a dry mix, which may be preferred by performers, and the audience stream may be a wet mix, which may be preferred by audience members. Thus, the difference in streams 108 and 108a/122 may not be solely characterized by different latencies, and may additionally or alternatively be characterized by different chains of processing steps.

The following description includes an example embodiment in accordance with the concepts described above. For further illustration, the following example refers to platform 100 (FIG. 1); however, the concepts described herein may be implemented using alternative computing platforms with fewer components, more components, or alternative components.

In some implementations, an audio processing and streaming server 110 comprises an input bus 112, a DSP 114, a first stream generator 118, and a second stream generator 120.

The input bus 112 includes a plurality of input audio channels, wherein each of the plurality of input audio channels corresponds to a respective input stream of a plurality of input streams 106, and each of the plurality of input streams is received at the server from one of a plurality of audio interface devices 102 located remotely from the server and from each other (e.g., necessitating communications via one or more communication networks 104). In some implementations, each input stream is labeled or otherwise associated with a unique identifier, which DSP 114 uses to assign respective streams to respective virtual or logical channels. The unique identifier may be associated with the interface device 102 from which the input stream was received. In other words, each input audio channel corresponds to a separate stream identifiable by a unique identifier corresponding to one of the interface devices 102. As such, input audio channels may also be referred to as audio channel inputs that are digitally received over communication network(s) 104 (e.g., over the Internet) with identifiers for each channel.

The DSP 114 is configured to apply at least one chain of processing steps (e.g., as described with reference to FIGS. 3D-3E below) to the plurality of input audio channels, and output a first master audio mix 108 and a second master audio mix 108a in accordance with the at least one chain of processing steps.

The first stream generator 118 is configured to convey the first master audio mix 108 to the plurality of audio interface devices 202 in a first live stream 108 with no added buffering latency (e.g., with the audio interface devices 102 being configured to skip missed packets as described above).

The second stream generator 120 is configured to buffer the second master audio mix 108a, and convey the buffered second master audio mix in a listener stream 122 to a plurality of computing devices (associated with Listeners in FIG. 1) located remotely from the server in a second live stream 122.

In some implementations, the first live stream 108 is associated with a maximum end-to-end latency corresponding to a difference in time between (i) transmitting a respective input stream 106 from a given audio interface device 102 and (ii) receiving the first live stream 108 at the given audio interface device 102. In some implementations, the maximum end-to-end latency is 25 milliseconds (ms) or less (e.g., 25 ms, 20 ms, 15 ms, and so forth). Alternatively, the maximum end-to-end latency may be greater than 25 ms (e.g., 30 ms). The maximum latency is due to the first live stream 108 being optimized for live collaboration between performers, thus requiring the end-to-end latency at the audio interface devices 102 to be less than or equal to the maximum human perceivable latency of 25 ms (or, in some implementations, slightly greater than 25 ms).

In some implementations, the second live stream 122 is associated with a delayed end-to-end latency corresponding to a difference in time between (i) transmitting a respective input stream 106 from a given audio interface device 102 and (ii) receiving the second live stream at a given computing device of a listener. The delayed latency is due to the second live stream 122 being optimized for audio quality.

In some implementations, the at least one chain of processing steps (also referred to as a signal chain or link) includes two or more of a reverb adjustment, a gain adjustment, a pan adjustment, and filter adjustment, an equalizer adjustment, and a noise gate adjustment. For example, FIG. 3E depicts a chain of two processing steps, including (i) FreeVerb (a reverb adjustment) and (ii) Noise Gate (a noise gate adjustment).

In some implementations, the chain(s) of processing steps are configurable in real time (e.g., during a given performance). Specifically, while conveying the first master audio mix to the plurality of audio interface devices 102 in the first live stream 108, if DSP 114 receives a setting adjustment from a particular audio interface device 102, DSP 114 adjusts the at least one chain of processing steps in accordance with the setting adjustment (e.g., adjusts a damping setting of the FreeVerb processing step), and conveys the first master audio mix in accordance with the adjusted at least one chain of processing steps in the first live stream 108 without interrupting the live stream to make the adjustments or to continue processing the audio input stream 106 with the adjusted settings.

In some implementations, DSP 114 may apply different signal chains to the performer mix 108 versus the audience mix 108*a*. Specifically, applying the at least one chain of processing steps to the plurality of input audio channels may include: (i) applying a first chain of processing steps to the plurality of input audio channels 106, wherein the first chain of processing steps is associated with a first processing latency, and the first master audio mix 108 is an output of the first chain of processing steps; and (ii) applying a second chain of processing steps, different from the first chain of processing steps, to the plurality of input audio channels 106, wherein the second chain of processing steps is associated with a second processing latency higher than the first processing latency, and the second master audio mix 108*a* is an output of the second chain of processing steps. The second chain of processing steps may include audio processing links (e.g., more complicated reverb or noise filters) that require too much latency to be effective for the performance mix, but nonetheless increase the quality of the audience mix 108*a*.

In some implementations, DSP 114 may mix or otherwise combine a plurality of inputs 106 into a group input, and apply a signal chain to the group input. Specifically, applying the at least one chain of processing steps to the plurality of input audio channels may include: mixing the plurality of input audio channels into an intermediate audio signal; and applying the at least one chain of processing steps to the intermediate audio signal. Applying a chain of processing steps to a single intermediary audio signal may result in a higher quality output, compared to applying the chain of processing steps to each input audio signal. For example, mixing all of the inputs 106 into a single audio track and applying a reverb operation to the single mixed track may sound better (e.g., less muddy) than separately applying the same reverb operation to each input 106 and then combining the outputs of each reverb operation. This is because any artifacts or unintended consequences of a given processing operation may be amplified upon combining each input channel. Thus, by combining the input channels first, and then applying the processing operation, such amplification may be avoided.

In some implementations, DSP 114 may apply different signal chains to different inputs 106. Specifically, applying the at least one chain of processing steps to the plurality of input audio channels may include applying a unique chain of processing steps to each respective input audio channel 106 of the plurality of input audio channels. For example, DSP 114 may apply a bandpass filter to the input audio channel 106 transmitted by audio interface device 102-1, and a reverberation effect combined with a noise gate to the input audio channel 106 transmitted by audio interface device 102-2. The application of different signal chains to different inputs allows for DSP 114 to account for different incoming sound qualities (e.g., due to different audio interface device hardware and/or room effects).

In some implementations, DSP 114 may apply different signal chain settings to different inputs 106. Specifically, applying the at least one chain of processing steps to the plurality of input audio channels may include applying a unique setting of the at least one chain of processing steps to each respective input audio channel of the plurality of input audio channels. For example, with reference to FIG. 3E, if the processing step is a FreeVerb link, then the settings associated with this step may include a dry/wet balance setting, a room size setting, and a damping setting. As another example, if another processing step is a Noise Gate link, then the settings associated with this step may include a threshold setting, an attack setting, a release setting, and a range setting. Each setting for a given link in the signal chain may be independently configured (e.g., by performers using configuration commands entered at respective audio interface devices 102), and the settings may be configured differently based on the specific input 106. For example, a first audio input channel 106 coming from audio interface device 102-1 may be configured with a relatively dry reverb setting and a smaller room size setting with more damping, while a second audio input channel 106 coming from audio interface device 102-2 may be configured with a relatively wet reverb setting and a larger room size with less damping.

In some implementations, DSP 114 may apply different signal chains to different groups of inputs. Specifically, applying the at least one chain of processing steps to the plurality of input audio channels may include: (i) applying a first chain of processing steps to a first subset of the plurality of input audio channels (e.g., to inputs arriving from audio interface devices 102-1 and 102-2); and (ii) applying a second chain of processing steps, different from the first chain of processing steps, to a second subset of the plurality of input audio channels (e.g., to inputs arriving from audio interface devices 102-3 through 102-*n*).

In some implementations, DSP 114 may apply the output of one signal chain to the input of another signal chain. Specifically, applying the at least one chain of processing steps to the plurality of input audio channels may include: (i) applying a first chain of processing steps to the plurality of input audio channels, creating an intermediate input audio signal (e.g., applying a first signal chain to inputs received from audio interface devices 102-1 and 102-2); and applying a second chain of processing steps, different from the first chain of processing steps, to the intermediate input audio signal (e.g., applying a second signal chain having different processing step(s) to the output of the first signal chain).

In some implementations, DSP 114 may send different and/or configurable output mixes 108 to different audio interface devices 102. Specifically, conveying the first master audio mix 108 to the plurality of audio interface devices in the first live stream may include: receiving a first performer mix profile setting (e.g., a small room size setting for a reverb link) from a first audio interface device 102-1 of the plurality of audio interface devices; receiving a second performer mix profile setting (e.g., a large room size setting for a reverb link), different from the first performer mix profile setting, from a second audio interface device 102-2 of the plurality of audio interface devices; conveying the first master audio mix 108 in accordance with the first performer mix profile setting to the first audio interface device 102-1 (e.g., transmitting an output stream 108 processed with the small room size setting); and conveying the first master audio mix 108 in accordance with the second performer mix profile setting to the second audio interface device 102-2 (e.g., transmitting an output stream 108 processed with the large room size setting).

In some implementations, DSP 114 may send different and/or configurable output mixes 108 to different groups of audio interface devices 102. Specifically, conveying the first master audio mix 108 to the plurality of audio interface devices in the first live stream may include: receiving a group performer mix profile setting (e.g., a particular dry/wet balance setting) from a first audio interface device 102-1 of the plurality of audio interface devices; and conveying the first master audio mix 108 in accordance with the group performer mix profile setting to a first subset of the plurality of audio interface devices (e.g., transmitting an output stream 108 processed with the particular dry/wet balance setting to a group of audio interface devices 102).

In some implementations, DSP 114 may send different and/or configurable output mixes 108*a* to different listening devices. Specifically, conveying the buffered second master audio mix 108*a* in a live stream 122 to the plurality of computing devices in the second live stream may include: receiving a first listener mix profile setting (e.g., a first reverb damping setting) from a first computing device of the plurality of computing devices; receiving a second listener mix profile setting (e.g., a second reverb damping setting), different from the first listener mix profile setting, from a second computing device of the plurality of computing devices; conveying the second master audio mix 108*a* in accordance with the first listener mix profile setting to the first computing device; and conveying the second master audio mix 108*a* in accordance with the second listener mix profile setting to the second computing device.

In some implementations, the configuration for how any particular server 110 should process audio can be represented using a description language (e.g., such as JavaScript Object Notation (JSON)). This state is persisted in a data store and manipulated via a user interface, such as via a web application. Example user interfaces are described in more detail below with reference to FIGS. 2-5.

In some implementations, server 110 may retrieve its state via a variety of mechanisms, such as querying the data store directly or using an intermediate application programming interface (API). Technologies such as web sockets may be used to push state changes to server 110 as soon as they are made by an end user (participant) via the interface (e.g., changes made in audio processing settings as described below with reference to FIGS. 3A-3E).

Configuration changes may trigger immediate updates to how server 110 (and, specifically, DSP 114) processes its audio signals. This could take the form of reloading all signal processing on the server, or by only making incremental updates to the parts that have been modified, as necessary to accurately reflect the new configuration state.

Figure 2:
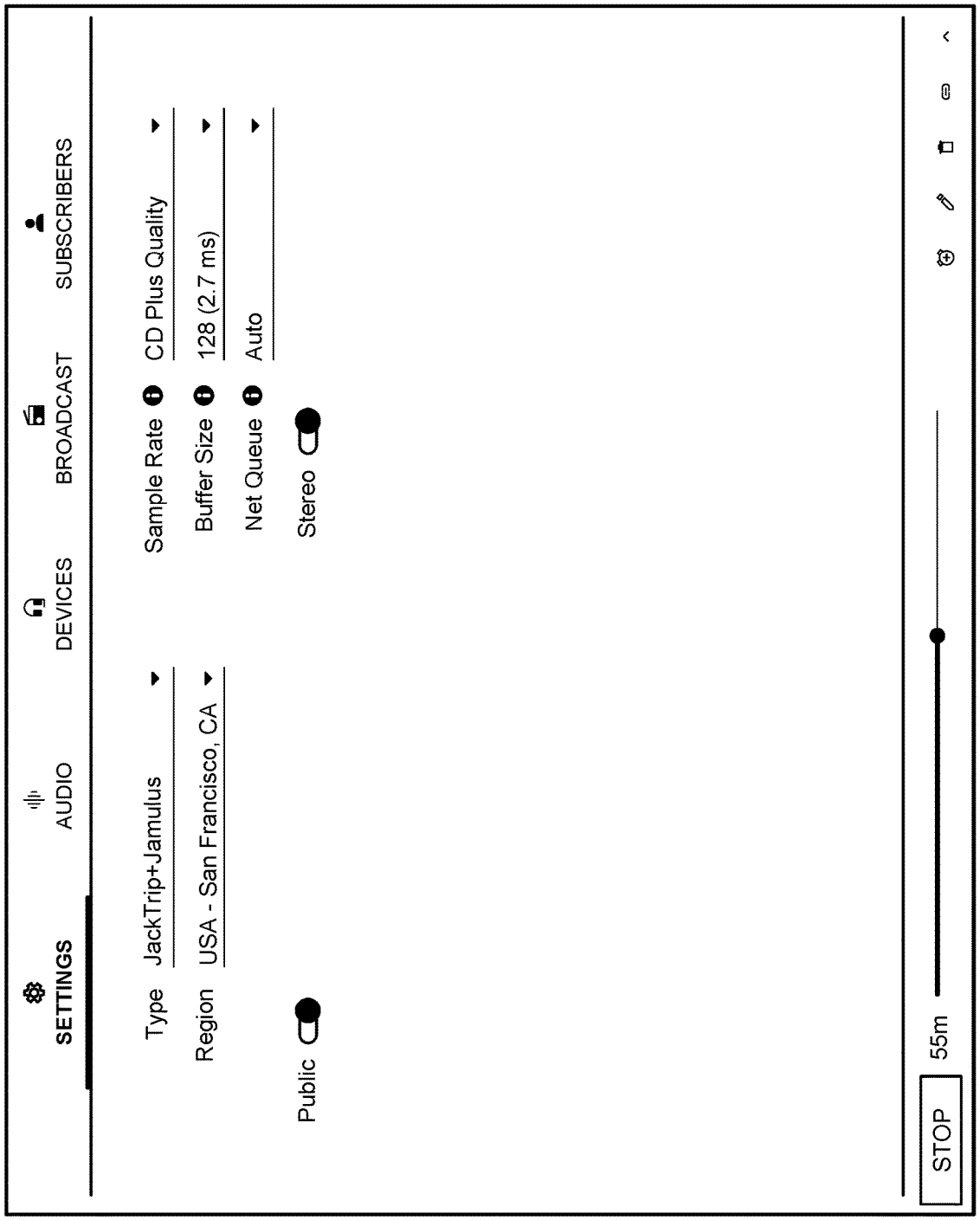
FIG. 2 is an example user interface including settings features for the cloud-based live performance streaming platform of FIG. 1 in accordance with some implementations.

FIG. 2 is an example user interface including settings features for the cloud-based live performance streaming platform 100 in accordance with some implementations. In this user interface, a user may set a sample rate, buffer size, net queue, and stereo settings, as well as recording protocol selections (e.g., JackTrip protocol+Jamulus protocol) and region selections (e.g., in order to optimize server selection for geography and minimize latency). In some implementations, platform 100 translates across protocols to provide performers and listeners with seamless audio recording and performance integration.

Figure 3A:
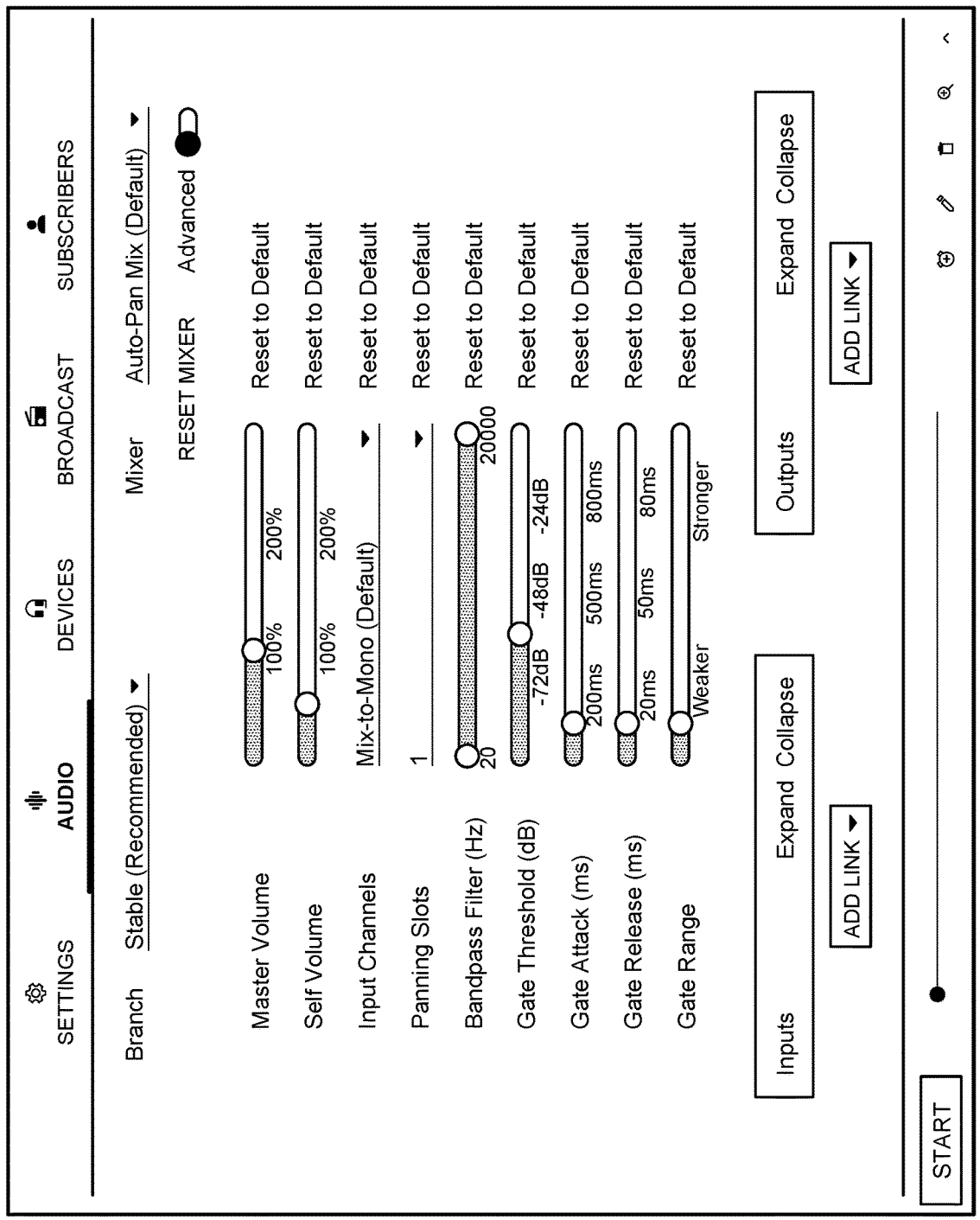
FIGS. 3A-3E are example user interfaces including audio processing features for the cloud-based live performance streaming platform of FIG. 1 in accordance with some implementations.
Figure 3B:
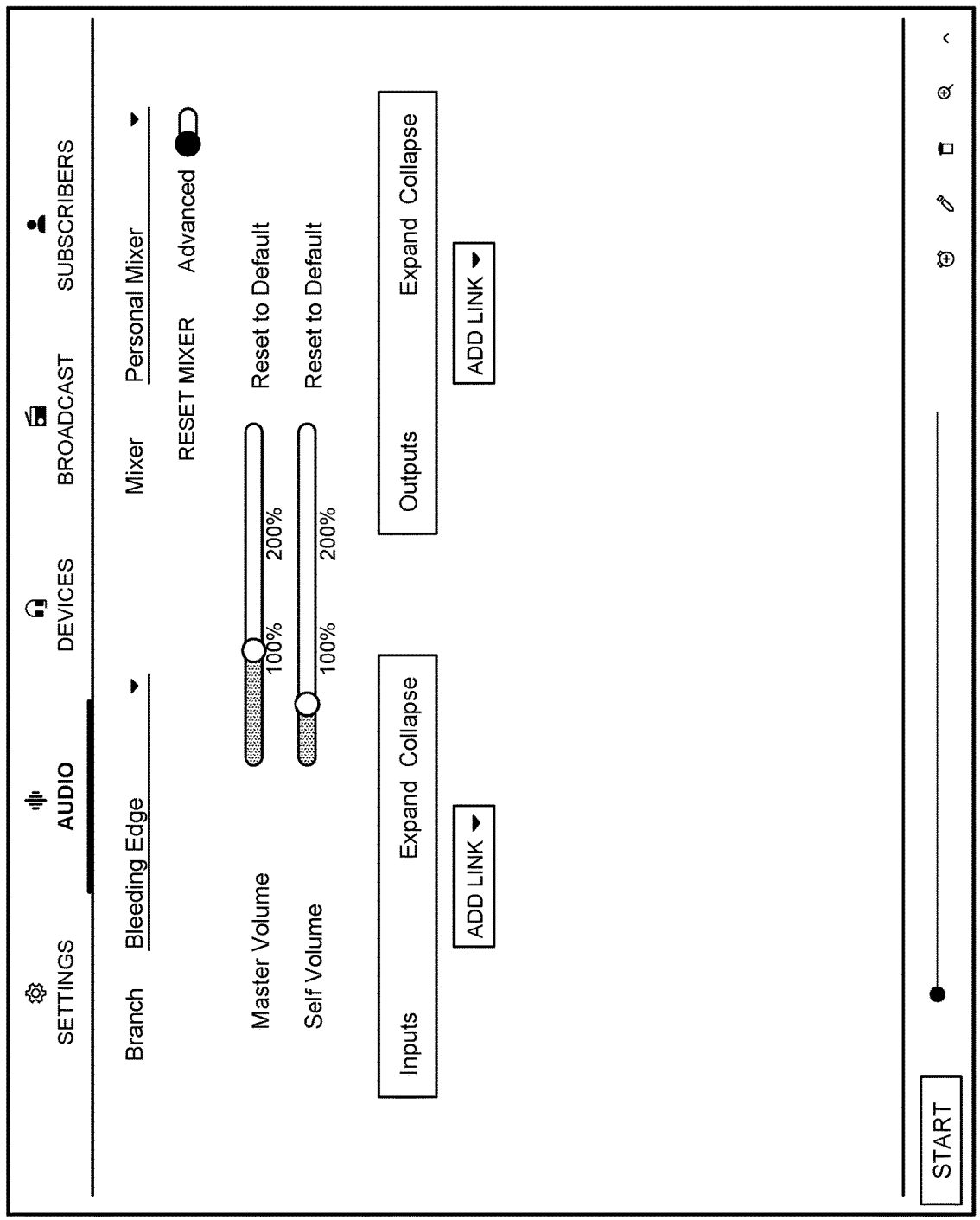
Figure 3C:
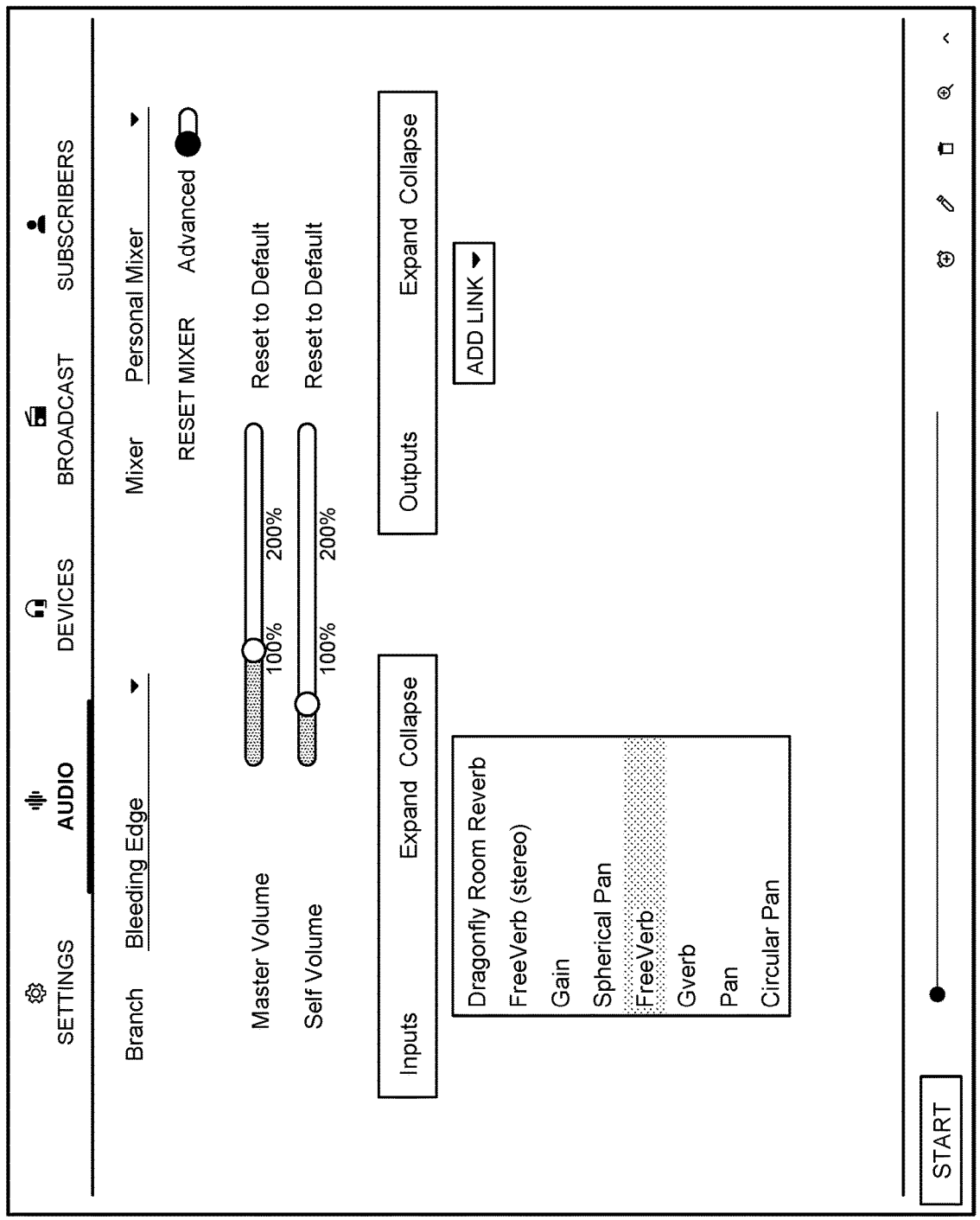
Figure 3D:
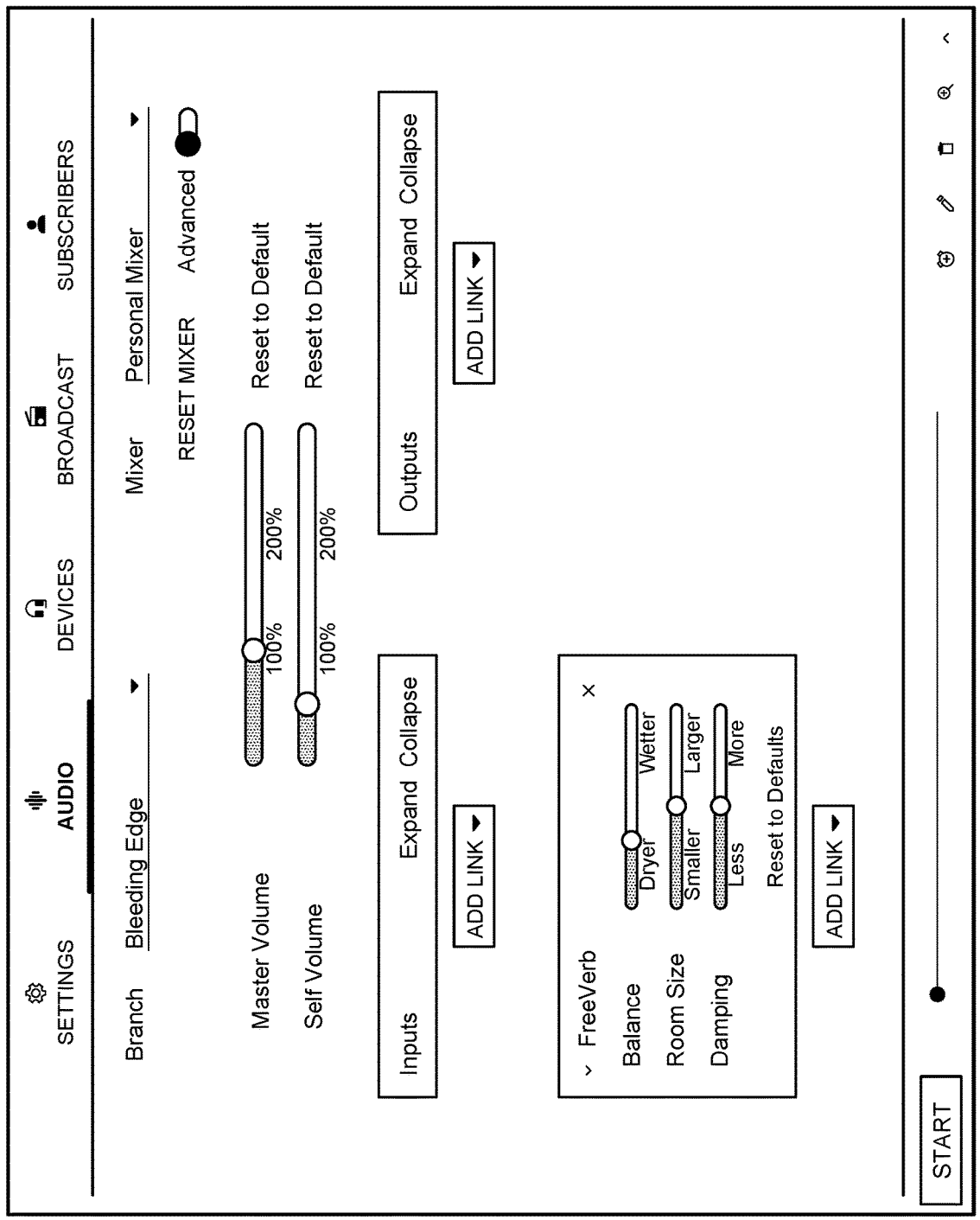
Figure 3E:
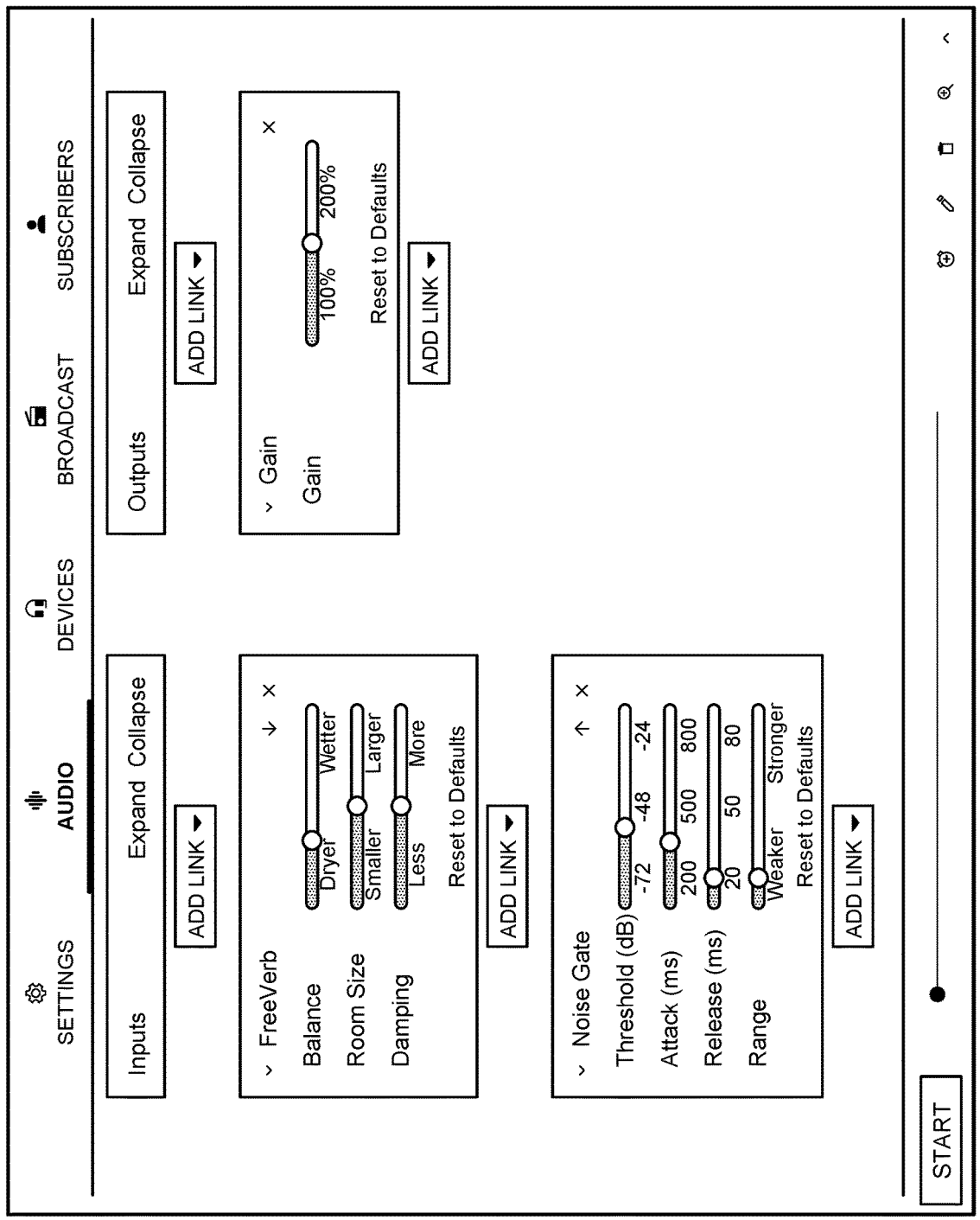

FIGS. 3A-3E are example user interfaces including audio processing features for the cloud-based live performance streaming platform 100 in accordance with some implementations. In FIG. 3A, a user may select preconfigured branch and mix settings, and/or reconfigure such settings. Mix settings may include one or more of master volume, self volume, input channels, panning slots, bandpass filter, gate threshold, gate attack, gate release, and gate range. Not all mix settings are required. FIG. 3B, for example, depicts a personal mix including only two mix settings—master volume and self volume. Master volume may control the volume of the master mix (including all input sources), while self volume may control the volume of only the input source corresponding to a particular performer, allowing the performer to be able to hear himself or herself more clearly in the mix. By selecting one of the "Add Link" affordances, a user may add to an input signal chain (labeled "Inputs") and/or an output signal chain (labeled "Outputs"). For example, FIG. 3C depicts a list of links that may be added to an input chain. In this example, the user may add one or more of Dragonfly Room Reverb, FreeVerb, Gain, Spherical Pan, FreeVerb, GVerb, Pan, and Circular Pan. FIG. 3D depicts the result of a signal chain selection from FIG. 3C. Specifically, upon selecting the FreeVerb option, a FreeVerb interface appears in the input signal chain, including settings associated with the FreeVerb processing step (dry/web balance, room size, and damping). FIG. 3E depicts selection of an additional link (Noise Gate) in the input signal chain. The links may be rearranged (e.g., by moving Noise Gate above FreeVerb), which changes the order in which the particular processing steps for the signal chain are applied to the audio signals. FIG. 3E also depicts an output signal chain, including a gain processing step (e.g., for adjusting the gain of the output mix).

Figure 4A:
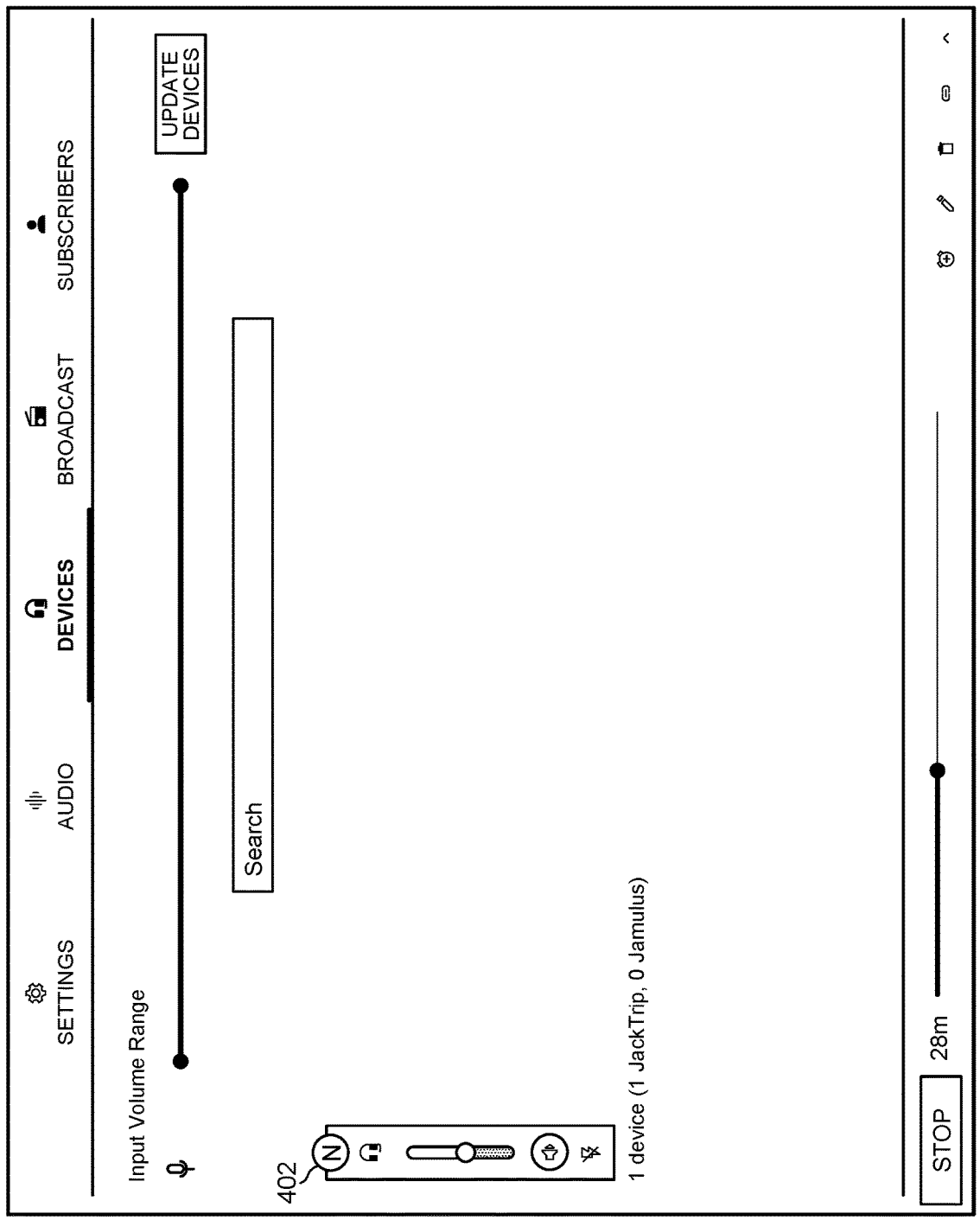
FIGS. 4A-4E are example user interfaces including device settings for the cloud-based live performance streaming platform of FIG. 1 in accordance with some implementations.
Figure 4B:
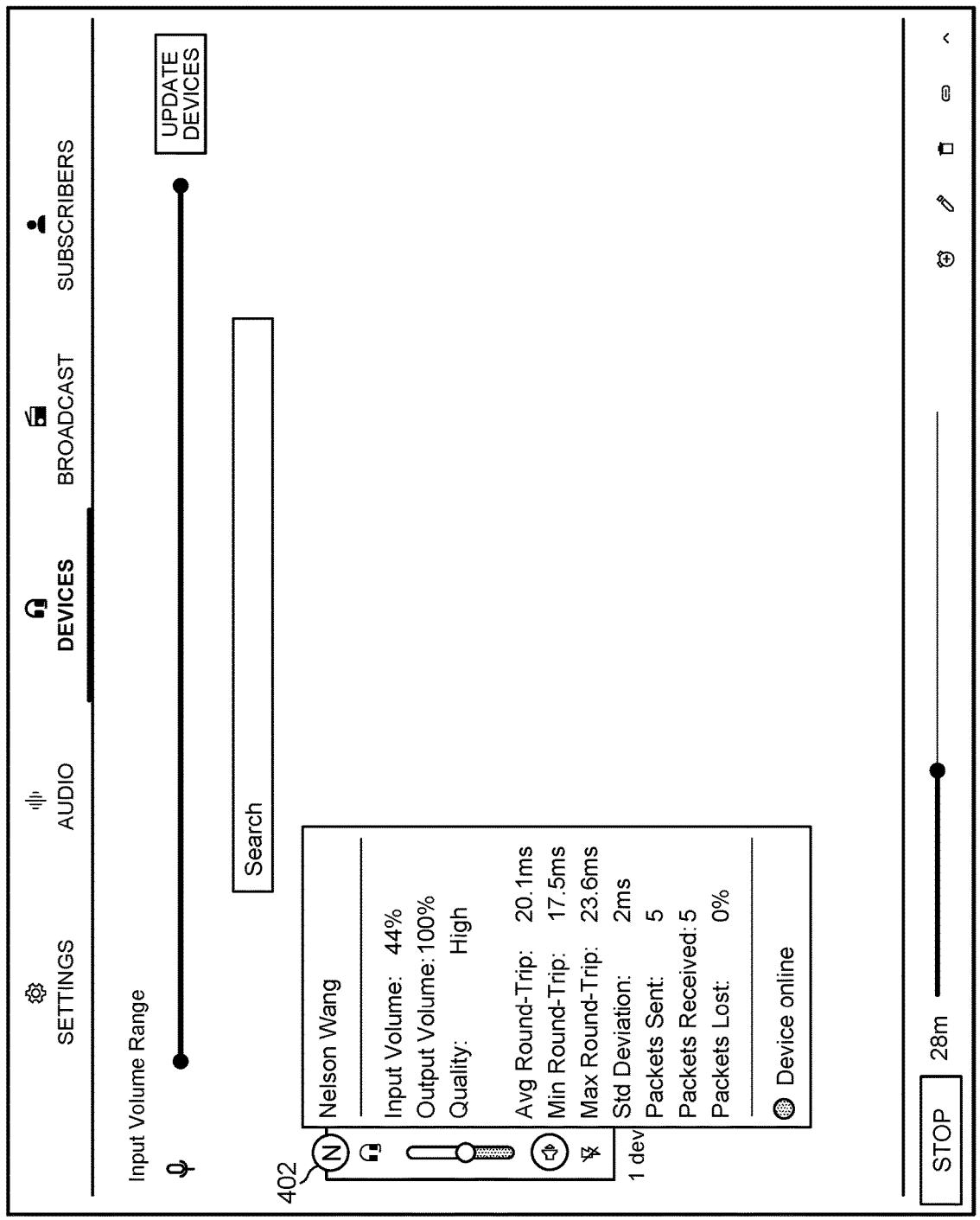

FIGS. 4A-4E are example user interfaces including device settings for the cloud-based live performance streaming platform 100 in accordance with some implementations. In FIG. 4A, only one audio interface device 402 is depicted (e.g., corresponding to audio interface device 102-1, FIG. 1). A user may adjust gain and/or other settings associated with the audio interface devices displayed in this user interface. For example, as shown in FIG. 4B, a user may select a particular audio interface device and view and/or adjust various settings associated with the selected audio interface device, including one or more of input volume, output volume, sound quality, average round-trip latency, minimum round-trip latency, maximum round-trip latency, standard deviation (for the latency values), packets sent, packets received, and packets lost.

Figure 4C:
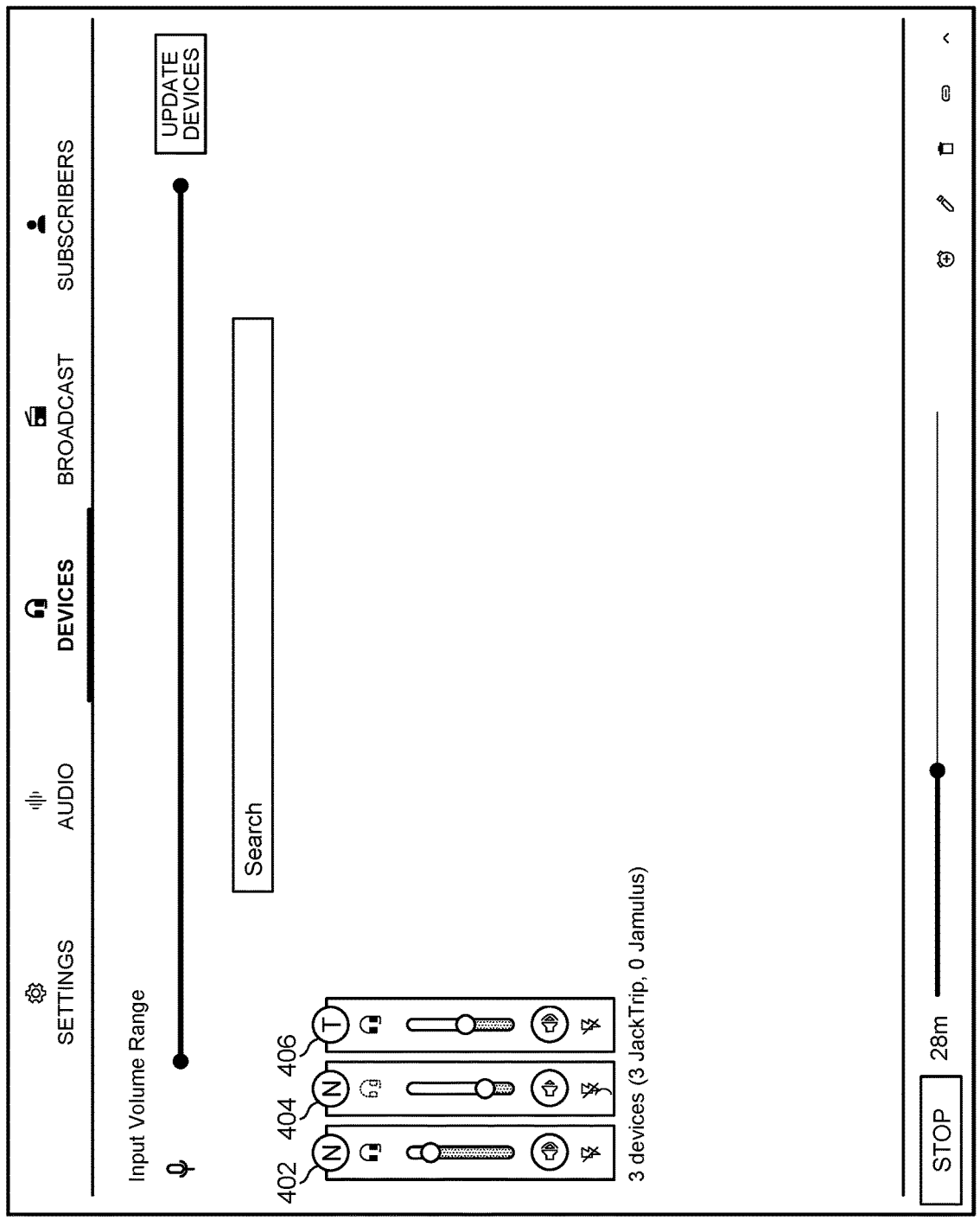

In FIG. 4C, three audio interface devices 402, 404, and 406 are depicted (e.g., corresponding to audio interface device 102-1, 102-2, and 102-3, FIG. 1). A user may adjust gain and/or other settings associated with a respective audio interface devices displayed in this user interface. For example, as shown in FIG. 4D, a user may select a particular audio interface device (e.g., 406) and view and/or adjust various settings associated with the selected audio interface device, including one or more of input volume, output volume, sound quality, average round-trip latency, minimum round-trip latency, maximum round-trip latency, standard deviation (for the latency values), packets sent, packets received, and packets lost.

Figure 4D:
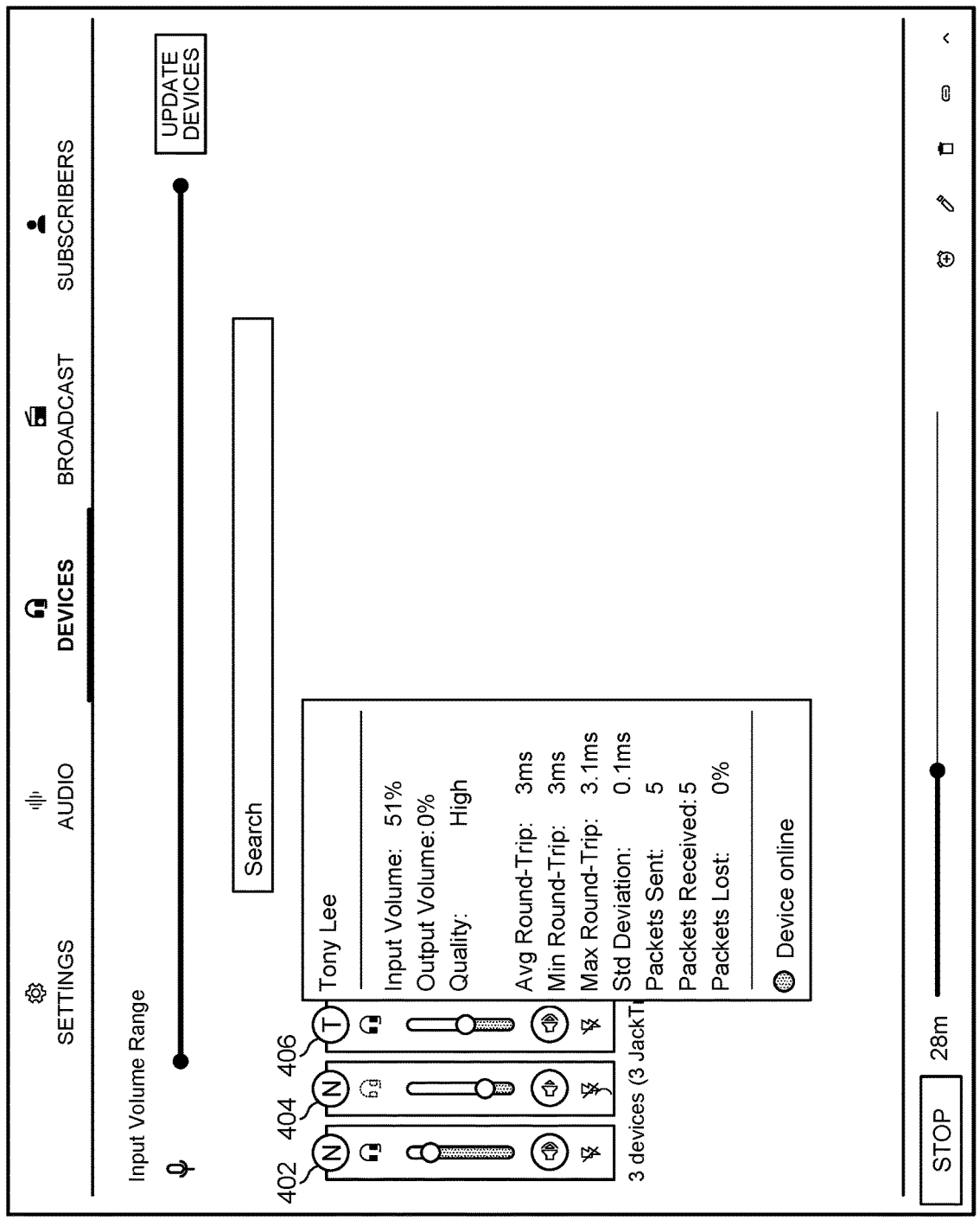
Figure 4E:
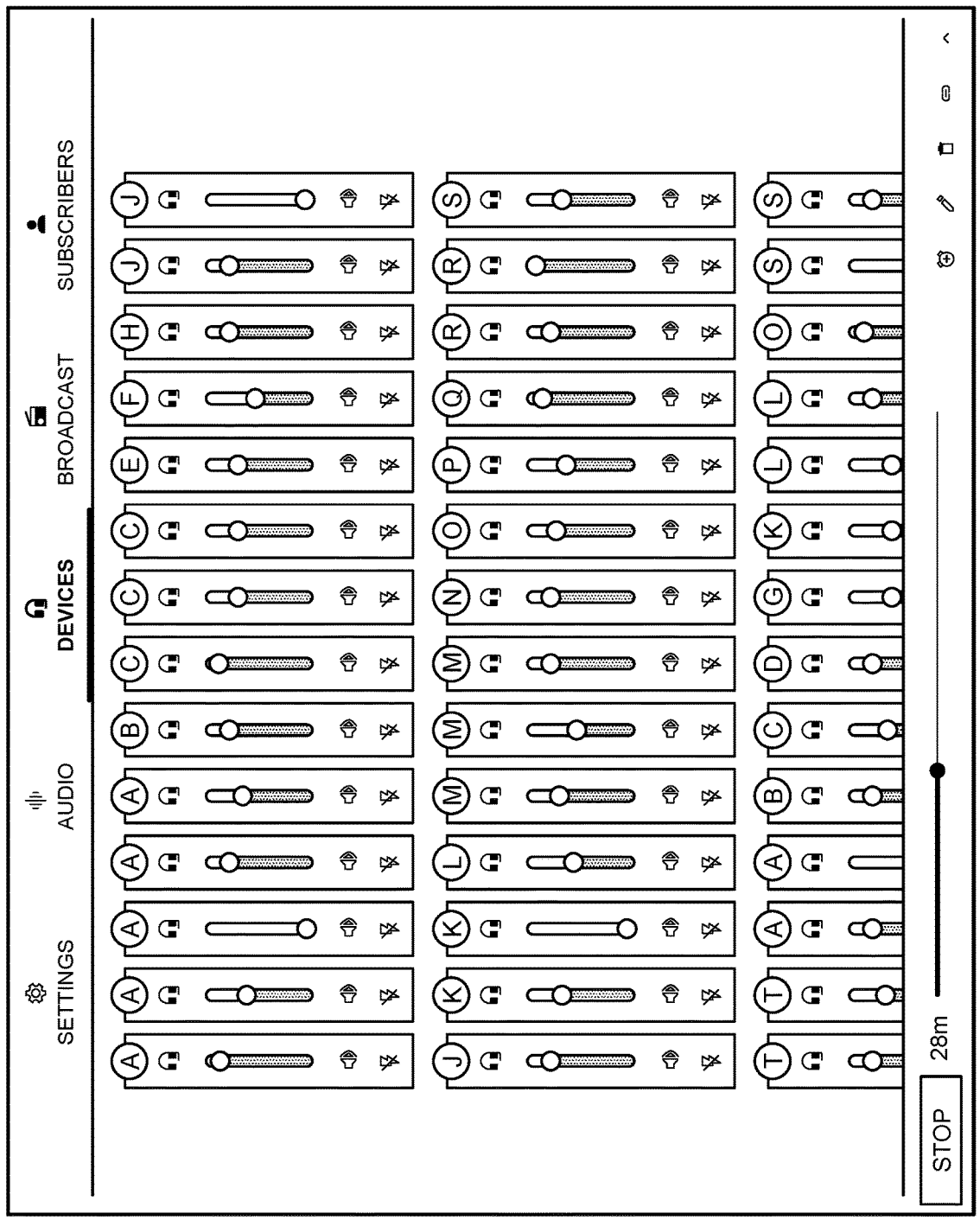

FIG. 4E depicts a plurality of audio interface devices (e.g., corresponding to audio interface devices 102-1 through 102-*n*), which may be displayed in the interfaces depicted in FIGS. 4A-4D depending on how many user interfaces are part of a given session. A user may adjust gain and/or other settings associated with any of the audio interface devices displayed in this user interface. For example, a user may select a particular audio interface device and view and/or adjust various settings associated with the selected audio interface device, including one or more of input volume, output volume, sound quality, average round-trip latency, minimum round-trip latency, maximum round-trip latency, standard deviation (for the latency values), packets sent, packets received, and packets lost (as depicted in FIGS. 4B and 4D).

In the interfaces depicted in FIGS. 4A-4E, the user who selects the audio interface device does not necessarily have to be the user associated with the audio interface device. For example, referring to FIG. 4D, a user of device 402, or even an audience member/listener, may select device 406 and view and/or adjust the corresponding audio settings based on a personal preference for the audio associated with that device (e.g., to turn down or turn up the audio coming from that particular device with respect to the rest of the mix). In some implementations, the changes made to these settings may affect the output streams of other performers and/or listeners (e.g., referred to as a global audio setting adjustment). In other implementations, the changes made to these settings may affect only the output stream of the user who made the adjustment (e.g., referred to as a local audio setting adjustment).

FIG. 5 is an example user interface including broadcast features for the cloud-based live performance streaming platform 100 in accordance with some implementations. A user may broadcast (make available to one or more computing devices associated with virtual audience members) a particular live stream (e.g., live stream 122, FIG. 1) by selecting a Broadcast affordance 502, a share option, or an option to copy a URL and share it.

By leveraging cloud computing technologies, a hub server (such as server 110) used to process audio for any given group of participants can be provisioned and configured on-demand such that resources are consumed only for the timespan of the collaborative session. Hub servers may be physically located as close as possible to the participants to minimize the latency, or delay in time for transmission of the audio signals. Modern servers with many processing cores can be utilized to perform advanced signal processing that may be infeasible to execute on clients.

In some implementations, a single server 110 operating as described herein can generate realistic sounding environments for hundreds of participants by leveraging DSP. In some implementations, platform 100 can scale to larger groups by linking together multiple servers 110.

Cloud datacenters typically include many thousands of physical servers, with tens or even hundreds of thousands of processing cores. These servers may be interconnected using extremely high speed networks capable of transmitting thousands of audio channels to each other with sub-millisecond latency. In some implementations, platform 100 may be scaled by distributing the work represented by signal chain configurations in DSP 114 across many different servers within a datacenter.

In some implementations, for extremely large populations that are distributed geographically, DSP processing can be scaled across multiple datacenters. All participants within a specific geography may connect to servers residing in one datacenter that is closest to them. Other participants within a different geography may connect to a different datacenter. Some of the signal chain processing may be performed within each datacenter, while an audio mix for each geographical group may be sent to servers in other datacenters. In this way, platform 100 may span thousands of servers across hundreds of datacenters (or more), to connect together hundreds of thousands (or even millions) of live participants into a very large, but realistic sounding "virtual stadium" environment.

The foregoing description has been described with reference to specific implementations. However, the illustrative discussions above are not intended to be exhaustive or to limit the claims to the precise forms disclosed. Many variations are possible in view of the above teachings. The implementations were chosen and described to best explain principles of operation and practical applications, to thereby enable others skilled in the art.

The various drawings illustrate a number of elements in a particular order. However, elements that are not order dependent may be reordered and other elements may be combined or separated. While some reordering or other groupings are specifically mentioned, others will be obvious to those of ordinary skill in the art, so the ordering and groupings presented herein are not an exhaustive list of alternatives.

As used herein: the singular forms "a", "an," and "the" include the plural forms as well, unless the context clearly indicates otherwise; the term "and/or" encompasses all possible combinations of one or more of the associated listed items; the terms "first," "second," etc. are only used to distinguish one element from another and do not limit the elements themselves; the term "if" may be construed to mean "when," "upon," "in response to," or "in accordance with," depending on the context; and the terms "include," "including," "comprise," and "comprising" specify particular features or operations but do not preclude additional features or operations.

The invention claimed is:

1. An audio processing and streaming server system for optimizing latency in a live performer stream and optimizing quality in a buffered listener stream, the server system comprising:
    an input bus including a plurality of input audio channels, wherein each of the plurality of input audio channels corresponds to a respective input stream of a plurality of input streams, wherein each of the plurality of input streams is received at the server from one of a plurality of audio interface devices located remotely from the server and from each other;
    a digital signal processor configured to:
        apply at least one signal chain comprising one or more processing steps to at least some of the plurality of input audio channels; and
        output a first master audio mix and a second master audio mix in accordance with the at least one signal chain;
    a first stream generator configured to convey the first master audio mix to the plurality of audio interface devices in a first live stream with no added buffering latency; and
    a second stream generator configured to:
        buffer the second master audio mix; and
        convey the buffered second master audio mix to a plurality of computing devices located remotely from the server in a second live stream, where the plurality of computing devices are distinct from the plurality of audio interface devices.

2. The audio processing and streaming server system of claim 1, wherein:
    the first live stream is associated with a maximum end-to-end latency corresponding to a difference in time between (i) transmitting respective input streams from the plurality of audio interface devices, and (ii) receiving the first live stream at the plurality of audio interface devices;
    the second live stream is associated with a delayed end-to-end latency corresponding to a difference in time between (i) transmitting respective input streams from the plurality of audio interface devices, and (ii) receiving the second live stream at the plurality of computing devices; and
    the delayed end-to-end latency is higher than the maximum end-to-end latency.

3. The audio processing and streaming server system of claim 2, wherein the maximum end-to-end latency is 25 ms or less.

4. The audio processing and streaming server system of claim 1, wherein the plurality of audio interface devices include respective analog-to-digital audio converters configured to convert vocal and/or instrumental audio signals to digital audio signals.

5. The audio processing and streaming server system of claim 1, wherein the at least one signal chain includes two or more of a reverb adjustment, a gain adjustment, a pan adjustment, and filter adjustment, an equalizer adjustment, and a noise gate adjustment.

6. The audio processing and streaming server system of claim 1, wherein applying the at least one signal chain to at least some of the plurality of input audio channels includes:
   applying a first signal chain comprising one or more processing steps to at least some of the plurality of input audio channels, wherein the first signal chain is associated with a first processing latency, and the first master audio mix is an output of the first signal chain of processing steps; and
   applying a second signal chain comprising one or more processing steps, different from the first signal chain comprising one or more processing steps, to at least some of the plurality of input audio channels, wherein the second signal chain is associated with a second processing latency higher than the first processing latency, and the second master audio mix is an output of the second signal chain.

7. The audio processing and streaming server system of claim 1, wherein applying the at least one signal chain comprising one or more processing steps to at least some of the plurality of input audio channels includes:
   mixing the plurality of input audio channels into an intermediate audio signal; and
   applying the at least one signal chain to the intermediate audio signal.

8. The audio processing and streaming server system of claim 1, wherein applying the at least one signal chain comprising one or more processing steps to at least some of the plurality of input audio channels includes applying a unique signal chain comprising one or more processing steps to each respective input audio channel of the plurality of input audio channels.

9. The audio processing and streaming server system of claim 1, wherein applying the at least one signal chain comprising one or more processing steps to at least some of the plurality of input audio channels includes applying a unique setting of the at least one signal chain to each respective input audio channel of the plurality of input audio channels.

10. The audio processing and streaming server system of claim 1, wherein applying the at least one signal chain comprising one or more processing steps to at least some of the plurality of input audio channels includes:
   applying a first signal chain comprising one or more processing steps to a first subset of the plurality of input audio channels; and
   applying a second signal chain comprising one or more processing steps, different from the first signal chain, to a second subset of the plurality of input audio channels.

11. The audio processing and streaming server system of claim 1, wherein applying the at least one signal chain comprising one or more processing steps to at least some of the plurality of input audio channels includes:
   applying a first signal chain comprising one or more processing steps to at least some of the plurality of input audio channels, creating an intermediate input audio signal; and
   applying a second signal chain comprising one or more processing steps, different from the first signal chain of processing steps, to the intermediate input audio signal.

12. The audio processing and streaming server system of claim 1, wherein conveying the first master audio mix to the plurality of audio interface devices in the first live stream includes:
   receiving a first performer mix profile setting from a first audio interface device of the plurality of audio interface devices;
   receiving a second performer mix profile setting, different from the first performer mix profile setting, from a second audio interface device of the plurality of audio interface devices;
   conveying the first master audio mix in accordance with the first performer mix profile setting to the first audio interface device; and
   conveying the first master audio mix in accordance with the second performer mix profile setting to the second audio interface device.

13. The audio processing and streaming server system of claim 1, wherein conveying the first master audio mix to the plurality of audio interface devices in the first live stream includes:
   receiving a group performer mix profile setting from a first audio interface device of the plurality of audio interface devices; and
   conveying the first master audio mix in accordance with the group performer mix profile setting to a first subset of the plurality of audio interface devices.

14. The audio processing and streaming server system of claim 1, wherein conveying the buffered second master audio mix to the plurality of computing devices in the second live stream includes:
   receiving a first listener mix profile setting from a first computing device of the plurality of computing devices;
   receiving a second listener mix profile setting, different from the first listener mix profile setting, from a second computing device of the plurality of computing devices;
   conveying the second master audio mix in accordance with the first listener mix profile setting to the first computing device; and
   conveying the second master audio mix in accordance with the second listener mix profile setting to the second computing device.

15. The audio processing and streaming server system of claim 1, wherein applying the at least one signal chain comprising one or more processing steps to at least some of the plurality of input audio channels includes:
   while conveying the first master audio mix to the plurality of audio interface devices in the first live stream, receiving a first setting adjustment from a first audio interface device of the plurality of audio interface devices;
   adjusting the at least one signal chain in accordance with the first setting adjustment; and
   conveying the first master audio mix in accordance with the adjusted at least one signal chain in the first live stream.

16. The audio processing and streaming server system of claim 1, wherein:
the audio processing and stream server system includes at least a first server located in a first geographic location and a second server located in a second geographic location different from the first geographic location; and
the digital signal processor is a distributed signal processor comprising at least one processor in the first server and at least one processor in the second server.

17. A method of processing and streaming audio signals at a server system, the method comprising:
receiving respective input streams of a plurality of input streams at a server from respective audio interfaces of a plurality of audio interface devices located remotely from the server and from each other, wherein each respective input stream of the plurality of input streams corresponds to a respective audio channel of a plurality of audio channels included in an input bus;
applying, at a digital signal processor, at least one signal chain comprising one or more processing steps to at least some of the plurality of input audio channels; and
outputting, at the digital signal processor, a first master audio mix and a second master audio mix in accordance with the at least one signal chain;
conveying, at a first stream generator, the first master audio mix to the plurality of audio interface devices in a first live stream with no added buffering latency;
buffering, at a second stream generator, the second master audio mix; and
conveying, at the second stream generator, the buffered second master audio mix to a plurality of computing devices located remotely from the server in a second live stream, where the plurality of computing devices are distinct from the plurality of audio interface devices.

18. The method of claim 17, wherein:
the first live stream is associated with a maximum end-to-end latency corresponding to a difference in time between (i) transmitting respective input streams from the plurality of audio interface devices, and (ii) receiving the first live stream at the plurality of audio interface devices;
the second live stream is associated with a delayed end-to-end latency corresponding to a difference in time between (i) transmitting respective input streams from the plurality of audio interface devices, and (ii) receiving the second live stream at the plurality of computing devices; and
the delayed end-to-end latency is higher than the maximum end-to-end latency.

19. A non-transitory computer readable storage medium storing one or more programs configured for execution by a computer system, the one or more programs including instructions for:
receiving respective input streams of a plurality of input streams at a server from respective audio interfaces of a plurality of audio interface devices located remotely from the server and from each other, wherein each respective input stream of the plurality of input streams corresponds to a respective audio channel of a plurality of audio channels included in an input bus;
applying, at a digital signal processor, at least one signal chain comprising one or more processing steps to at least some of the plurality of input audio channels; and
outputting, at the digital signal processor, a first master audio mix and a second master audio mix in accordance with the at least one signal chain;
conveying, at a first stream generator, the first master audio mix to the plurality of audio interface devices in a first live stream with no added buffering latency;
buffering, at a second stream generator, the second master audio mix; and
conveying, at the second stream generator, the buffered second master audio mix to a plurality of computing devices located remotely from the server in a second live stream, where the plurality of computing devices are distinct from the plurality of audio interface devices.

20. The non-transitory computer readable storage medium of claim 19, wherein:
the first live stream is associated with a maximum end-to-end latency corresponding to a difference in time between (i) transmitting respective input streams from the plurality of audio interface devices, and (ii) receiving the first live stream at the plurality of audio interface devices;
the second live stream is associated with a delayed end-to-end latency corresponding to a difference in time between (i) transmitting respective input streams from the plurality of audio interface devices, and (ii) receiving the second live stream at the plurality of computing devices; and
the delayed end-to-end latency is higher than the maximum end-to-end latency.

* * * * *